US008002938B2

(12) United States Patent
Elwakil et al.

(10) Patent No.: US 8,002,938 B2
(45) Date of Patent: *Aug. 23, 2011

(54) DECORATIVE LAMINATED SAFETY GLASS

(75) Inventors: Hamdy A. Elwakil, Hockessin, DE (US); Ronald Roman, Hockessin, DE (US); Rebecca L. Smith, Vienna, WV (US); Chaucer C. Tang, Kennett Square, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 1136 days.

This patent is subject to a terminal disclaimer.

(21) Appl. No.: 11/598,477

(22) Filed: Nov. 13, 2006

(65) Prior Publication Data

US 2007/0125490 A1    Jun. 7, 2007

Related U.S. Application Data

(63) Continuation of application No. 10/878,582, filed on Jun. 28, 2004, now abandoned, and a continuation-in-part of application No. 10/644,323, filed on Aug. 20, 2003, now Pat. No. 7,041,163, application No. 11/598,477, filed on Nov. 13, 2006, which is a continuation-in-part of application No. 10/521,500, filed as application No. PCT/US03/26193 on Jan. 11, 2005, now abandoned.

(60) Provisional application No. 60/483,515, filed on Jun. 26, 2003, provisional application No. 60/483,516, filed on Jun. 26, 2003, provisional application No. 60/404,700, filed on Aug. 20, 2002, provisional application No. 60/483,515, filed on Jun. 26, 2003.

(51) Int. Cl.
B32B 37/02 (2006.01)
B32B 37/14 (2006.01)
B32B 38/14 (2006.01)
B44C 3/02 (2006.01)
B44C 5/04 (2006.01)
C03C 27/04 (2006.01)
C03C 27/10 (2006.01)
C03C 27/12 (2006.01)
B44C 3/08 (2006.01)
B44C 3/12 (2006.01)

(52) U.S. Cl. ........ 156/277; 156/102; 156/196; 156/219; 101/491

(58) Field of Classification Search ............... 156/109, 156/196, 219, 277; 101/483, 491
See application file for complete search history.

(56) References Cited

U.S. PATENT DOCUMENTS

| 3,444,732 | A | * | 5/1969 | Mckinley et al. | 73/150 A |
|---|---|---|---|---|---|
| 3,868,286 | A | * | 2/1975 | Fariss et al. | 156/163 |
| 3,922,456 | A | * | 11/1975 | Baldridge | 428/203 |
| 4,173,672 | A | * | 11/1979 | Mannheim | 428/203 |
| 4,303,718 | A | | 12/1981 | Snelgrove | |
| 4,868,581 | A | | 9/1989 | Mouri et al. | |
| 4,968,553 | A | | 11/1990 | Cesar | |
| 5,085,698 | A | | 2/1992 | Ma et al. | |
| 5,231,131 | A | | 7/1993 | Chu et al. | |
| 5,342,653 | A | * | 8/1994 | Simon et al. | 427/256 |
| 5,346,549 | A | * | 9/1994 | Johnson | 106/708 |
| 5,425,977 | A | | 6/1995 | Hopfe | |
| 5,519,085 | A | | 5/1996 | Ma et al. | |
| 5,914,178 | A | | 6/1999 | Sol et al. | |
| 6,013,330 | A | | 1/2000 | Lutz | |
| 6,077,374 | A | | 6/2000 | Hopfe | |
| 6,099,415 | A | | 8/2000 | Lutz | |
| 6,113,679 | A | | 9/2000 | Adkins et al. | |
| 6,248,804 | B1 | | 6/2001 | Lutz | |
| 6,432,519 | B1 | | 8/2002 | Kazama et al. | |
| 6,494,943 | B1 | | 12/2002 | Yu et al. | |
| 6,506,245 | B1 | | 1/2003 | Kinney et al. | |
| 6,552,690 | B2 | * | 4/2003 | Veerasamy | 343/713 |
| 6,596,067 | B2 | | 7/2003 | Menzel et al. | |
| 6,852,156 | B2 | | 2/2005 | Yeh et al. | |
| 7,041,163 | B2 | | 5/2006 | Roman et al. | |
| 7,122,077 | B2 | | 10/2006 | Bauer et al. | |
| 2002/0009553 | A1 | | 1/2002 | Lutz | |
| 2002/0014184 | A1 | | 2/2002 | Yeh et al. | |
| 2002/0055006 | A1 | | 5/2002 | Vogel et al. | |
| 2004/0234735 | A1 | | 11/2004 | Reynolds et al. | |
| 2005/0118401 | A1 | | 6/2005 | Smith et al. | |
| 2005/0196560 | A1 | | 9/2005 | Elwakil | |
| 2005/0215664 | A1 | | 9/2005 | Elwakil et al. | |
| 2005/0234185 | A1 | | 10/2005 | Smith et al. | |

(Continued)

FOREIGN PATENT DOCUMENTS

DE    29706880 U1    7/1997

(Continued)

OTHER PUBLICATIONS

NPIRI Raw Materials Data Handbook, vol. 4, Pigments (2nd Ed. 2001).*

(Continued)

*Primary Examiner* — Sonya Mazumdar
(74) *Attorney, Agent, or Firm* — Kevin S. Dobson; Mark D. Kuller

(57) ABSTRACT

The present invention is a decorative laminated article comprising an image bearing thermoplastic interlayer wherein the image has been printed on the interlayer using an ink jet printing process, wherein the pigment comprises at least one pigment selected from the group consisting of: PY 120; PY 155; PY 128; PY 180; PY 95; PY 93; PV19/PR 202; PR 122; PB 15:4; PB 15:3; and PBI 7. The interlayer material of the present invention can be, for example, PVB, PET, or polyurethane.

30 Claims, No Drawings

U.S. PATENT DOCUMENTS

| | | |
|---|---|---|
| 2005/0271865 A1 | 12/2005 | Elwakil et al. |
| 2005/0282928 A1 | 12/2005 | Lin et al. |
| 2005/0285920 A1 | 12/2005 | Smith et al. |
| 2008/0105371 A1* | 5/2008 | Smith et al. .................. 156/277 |
| 2010/0215925 A1* | 8/2010 | Chen et al. .................. 428/203 |

FOREIGN PATENT DOCUMENTS

| | | |
|---|---|---|
| DE | 20100717 U1 | 5/2001 |
| EP | 0 254 187 | 1/1988 |
| EP | 0 556 649 B1 | 6/1999 |
| EP | 1 114 734 A1 | 7/2001 |
| EP | 1 129 844 A1 | 9/2001 |
| WO | WO 99/58334 | 11/1999 |
| WO | WO 01/30918 A1 | 5/2001 |
| WO | WO 01/30919 A1 | 5/2001 |
| WO | WO 01/94476 A2 | 12/2001 |
| WO | WO 02/18154 A1 | 3/2002 |
| WO | WO 2004/011271 A1 | 2/2004 |
| WO | WO 2004/018197 A1 | 3/2004 |

OTHER PUBLICATIONS

W. Herbst et al., Industrial Organic Pigments (2nd Ed. 1997).*

Pigment Handbook, vol. 1, Properties and Economics, P. Lewis Editor (2nd Ed. 1988).*

International Search Report from counterpart PCT/US03/26193, Aug. 11, 2004.

Written Opinion from counterpart PCT/US03/26193, Aug. 11, 2004.

International Preliminary Examination Report from counterpart PCT/US03/26193, Aug. 11, 2004.

Product Information, Dowanol DPMA Dipropylene Glycol Methyl Ether Acetate (Dow, Mar. 2004).

Product Information, Dowanol DPnP Dipropylene Glycol n-Propyl Ether (Dow, Mar. 2004).

Product Information, Dowanol DPM Dipropylene Glycol Methyl Ether (Dow, Mar. 2004).

* cited by examiner

DECORATIVE LAMINATED SAFETY GLASS

CROSS REFERENCE SECTION

This application is a continuation of U.S. patent application Ser. No. 10/878,582, filed Jun. 28, 2004 now abandoned, which:

(a) claims priority to U.S. Provisional Application Ser. No. 60/483,515, filed Jun. 26, 2003, and (b) is a continuation-in-part of U.S. application Ser. No. 10/644,323, filed Aug. 20, 2003 (issued as U.S. Pat. No. 7,041,163 on May 9, 2006), which claims priority from U.S. Provisional Application Ser. No. 60/483,516, filed Jun. 26, 2003.

This application is a continuation-in-part of patent application Ser. No. 10/521,500, which is 371 of PCT/US03/26193, filed Aug. 20, 2003 now abandoned, and which claims priority to U.S. Provisional Application Ser. No. 60/404,700, filed Aug. 20, 2002 and to U.S. Provisional Application Ser. No. 60/483,515, filed Jun. 26, 2003.

BACKGROUND OF THE INVENTION

The present invention relates to decorative laminates bearing images printed on an interlayer by a process of ink jet printing. The present invention particularly relates to decorative laminates wherein the image has been printed onto an interlayer comprising polyvinyl butyral (PVB). The present invention also relates to ink formulations that are useful for preparing the laminates of the present invention.

Decorative laminates are known and obtained by various processes. DE 29706880, U.S. Pat. Nos. 4,968,553, 5,914,178, EP 1129844A1, and DE 20100717 disclose making decorative glass laminates via a silk screening process. Silk-screening an image onto an interlayer is a very time-consuming and expensive process for making decorative laminated safety glass. A process for making decorative glass laminates has also been described in U.S. Pat. No. 4,173,672. This patent describes a transfer lamination process wherein an image printed on paper is transferred to a thermoplastic film, and the film bearing the transferred image is then laminated between glass sheets.

Use of "ink jet" technology to print on PVB and polyurethanes using dye based inks for laminated safety glass has been disclosed in WO0218154. Ink jet printing is known and is a conventional process for printing wherein ink droplets are propelled through a printing head at a high speed towards a printing substrate. Ink jet technology is very flexible because any digital image can be printed onto a substrate.

However, a disadvantage of printing directly on PVB using an ink jet printing process is that PVB interlayers have a roughened surface pattern (Rz from 30-60 µm) that can cause poor image quality in a printed image. The roughened surface pattern is necessary in a PVB lamination process to obtain laminates free of air bubbles and other defects caused by the presence of trapped air during the lamination process. However, when ink jet printing onto PVB, the rough surface pattern can effect image quality with respect to mottle and resolution.

Other problems with conventional processes for ink-jet printing are encountered due to the inks used in conventional ink-jet processes. Low viscosity inks are required in a conventional ink jet printing process to alleviate high pressure build-up in the print head of the ink jet printer, and subsequent damage to the head and/or poor quality in the printed image. Ink jet printing is carried out conventionally by either (a) drop on demand (DOD) processes, such as a piezo electric printing or thermal ink jet printing processes, or (b) continuous drop ink jet printing. There are other factors as well that make low viscosity inks necessary and preferable in ink jet printing processes. However, use of conventional inks that are suitable for ink jet printing can result in poor image quality on a thermoplastic interlayer. Poor image quality can be the result when a low viscosity ink is sprayed onto a roughened surface such as a PVB surface that has been prepared for lamination, due to ink running from high points to low spots on the interlayer surface.

Another potential problem with printing an image on an interlayer prior to lamination onto another substrate is that the adhesive bond between the interlayer and the substrate can be significantly weakened due to colorant on the surface of the interlayer that can reduce the "effective" bonding surface area between the substrate and the interlayer. By "effective bonding surface" it is meant to describe that surface area where the interlayer and the substrate are in direct contact with each other without an intervening colorant layer. Reduction of the adhesive force of the laminate can result in the laminate having poor performance as a safety glass, or in the application for which it was intended.

The Applicants have developed a system for ink jet printing on thermoplastic interlayers in such a way that when laminated to a substrate, the laminate maintains its strength and resilience against breakage, while at the same time a quality image is produced on the interlayer printing substrate.

SUMMARY OF THE INVENTION

In one aspect, the present invention is a process for obtaining a decorative laminate having a laminate adhesive strength of at least about 1000 psi, the process comprising the steps: ink-jet printing a digital image onto at least one surface of a thermoplastic interlayer; and laminating the image-bearing interlayer between two transparent sheets of a suitable lamination substrate.

In another aspect, the present invention is a process for ink jet printing a digital image onto a thermoplastic interlayer, the process comprising the step of jetting either an aqueous or solvent-based pigmented ink onto a roughened interlayer surface, the surface having an $R_z$ of from about 30 µm to about 60 µm and a Frequency of greater than about 0.9 cycles/mm, wherein the ink has a viscosity that is sufficiently low that it can be jetted through an ink jet printing head without heating the printing head above ambient temperature.

In another aspect, the present invention is a decorative laminate comprising at least one sheet of interlayer material bearing an image on at least one surface of the interlayer sheet, wherein the image was printed using an ink jet printing process comprising the step of jetting either an aqueous or solvent-based pigmented ink onto a roughened interlayer surface, the surface having an $R_z$ of from about 30 µm to about 60 µm and a Frequency of greater than 0.9 cycles/mm, wherein the ink has a viscosity that is sufficiently low that it can be jetted through an ink jet printing head without heating the printing head above ambient temperature.

In another aspect, the present invention is a thermoplastic interlayer sheet bearing an image on at least one surface of the interlayer sheet, the image being printed on the sheet by a process comprising the step jetting either an aqueous or solvent-based pigmented ink onto a roughened interlayer surface, the surface having an $R_z$ of from about 30 µm to about 60 µm and a Frequency of greater than 0.9 cycles/mm, wherein the ink has a viscosity that is sufficiently low that it can be jetted through an ink jet printing head without heating the printing head above ambient temperature.

The invention is directed to a process for obtaining an image-bearing laminate having a laminate adhesive strength of at least about 1000 psi, the process comprising the steps: "ink jet" printing a digital image, using a pigmented ink, onto at least one surface of a thermoplastic polymer interlayer to obtain an image-bearing interlayer; and laminating the image-bearing interlayer between sheets of transparent materials to obtain an image-bearing laminate, wherein the thermoplastic interlayer is a polymer selected from: polyvinyl butyrals (PVB), polyurethanes, polyethylenes, polypropylenes, and polyesters, ethylene vinyl acetate (EVA) and wherein the pigments comprise at least one pigment selected from the group consisting of Pigment Yellow ("PY") 120; PY 155; PY 128; PY 180; PY 95; PY 93; Pigment Violet ("PV") 19/Pigment Red ("PR") 202; PR 122; Pigment Blue ("PB") 15:4; PB 15:3; and Pigment Black ("PBI") 7. Preferably the pigmented ink is jetted onto a roughened polymer interlayer surface, the surface having a roughness ($R_z$) of from about 30 m to about 60 m and a Frequency of greater than 0.9 cycles/mm, wherein the ink comprises a dispersant and optionally comprises a binder in either an aqueous or non-aqueous vehicle.

Preferably the viscosity of the ink is in the range of from about 1 cps to about 30 cps measured at 25° C. More preferably the viscosity of the ink is in the range of from about 1 cps to about 20 cps. Even more preferably the ink is in the range of from about 1 cps to about 15 cps. Yet even more preferably the viscosity of the ink is in the range of from about 1 cps to about 12 cps. Preferably the pigment is dispersed in a vehicle having a water content of no more than 16 wt %.

Preferably the vehicle comprises an organic solvent or mixture of organic solvents.

Preferably the organic solvent or the solvents in the mixture are selected from solvents in the group consisting of: propylene glycol ethers; dipropylene glycol ethers; ethylene glycol butyl ethers; dipropylene glycol monomethyl ether esters. Preferably the vehicle comprises dipropylene glycol monomethyl ether acetate (DPMA) and water. Preferably the vehicle consists essentially of DPMA.

In one embodiment, the ink preferably comprises a dispersant but no binder. Preferably the dispersant comprises a structured polymer.

In another embodiment, the ink preferably comprises a dispersant and a binder. Preferably the dispersant comprises: AB, BAB and ABC block copolymers, branched polymers and graft polymers. Preferably the binder is selected from binders in the group consisting of: polyurethane (PUR); polyvinyl pyrilidone/polyvinyl acetate (PVP/VA); PVP; and mixtures of any of these.

Preferably the thermoplastic interlayer is polyvinyl butyral (PVB), polyethylene terephthalate (PET), polyurethane (PUR), or ethylene vinyl acetate (EVA). Preferably the interlayer is polyvinyl butyral (PVB).

Preferably the image is printed using a drop on demand (DOD) ink jet printing process. In one preferred embodiment, the DOD process is a piezo electric process. In another preferred embodiment, the DOD process is a thermal ink jet printing process. In yet another preferred embodiment, the image is printed using a continuous drop ink jet printing process.

The invention is also directed to a decorative laminate having an adhesive strength of at least about 1000 psi comprising at least one sheet of interlayer material bearing an image on at least one surface of the interlayer sheet, wherein the image was printed using an ink jet printing process comprising the step of jetting either an aqueous or solvent-based pigmented ink onto either a smooth or a roughened interlayer surface, the roughened surface having a roughness ($R_z$) of from about 30 μm to about 60 μm and a Frequency of greater than 0.9, wherein the pigment comprises at least one pigment selected from the group consisting of PY 139; PY 120; PY 155; PY 14; PY 110; PY 128; PY 180; PY 95; PY 93; PV19/PR 202; PR 122; PB 15:4; PB 15:3; and PBI 7; and wherein the ink has a viscosity that is sufficiently low that it can be jetted through an ink jet printing head without heating the printing head, and wherein the ink comprises a dispersant and optionally comprises a binder.

Preferably the interlayer is laminated between two sheets of glass.

Preferably the laminate has an adhesive strength of at least about 1400 psi, more preferably at least about 1700 psi, and most preferably at least about 1800 psi.

The laminate of claim 27 comprising an image printed using at least two inks, wherein each ink, when printed onto the interlayer individually, has an adhesion of at least 1000 psi.

Preferably each ink, when printed onto the interlayer individually, has an adhesion of at least 1400 psi.

Preferably each ink, when printed onto the interlayer individually, has a Delta E after 480 KLangley of less than 10.

The invention is also directed to a thermoplastic interlayer sheet bearing an image on at least one surface of the interlayer sheet, the image being printed on the sheet by a process comprising the step: jetting either an aqueous or solvent-based pigmented ink onto a roughened interlayer surface, the surface having a roughness ($R_z$) of from about 30 μm to about 60 μm and a Frequency of greater than 0.9 cycles/mm, wherein the pigment comprises at least one pigment selected from the group consisting PY 120; PY 155; PY 128; PY 180; PY 95; PY 93; PV19/PR 202; PR 122; PB 15:4; PB 15:3; and PBI 7; and wherein the ink has a viscosity that is sufficiently low that it can be jetted through an ink jet printing head without heating the printing head, and wherein the ink comprises a dispersant and optionally comprises a binder.

Preferably the interlayer has a surface roughness Frequency of from about 1.0 cycles/mm to about 2.9 cycles/mm. Most preferably the interlayer has a surface roughness Frequency of from about 1.1 cycles/mm to about 2.5 cycles/mm.

Preferably the interlayer comprises PVB, PET, or PUR. Most preferably the interlayer is PVB.

The invention is also directed to a thermoplastic interlayer sheet bearing an image on at least one surface of the interlayer sheet, the image being printed on the sheet by a process comprising the step: jetting either an aqueous or solvent-based pigmented ink onto a smooth interlayer surface having a surface roughness ($R_z$) of less than 30 μm, wherein the pigment comprises at least one pigment selected from the group consisting of PY 139; PY 120; PY 155; PY 14; PY 110; PY 128; PY 180; PY 95; PY 93; PV19/PR 202; PR 122; PB 15:4; PB 15:3; and PBI 7; and wherein the ink has a viscosity that is sufficiently low that it can be jetted through an ink jet printing head without heating the printing head, and wherein the ink comprises a dispersant and optionally comprises a binder.

DETAILED DESCRIPTION OF THE INVENTION

In one embodiment, the present invention is a method for printing an image onto a thermoplastic interlayer material by an ink jet printing process. A suitable thermoplastic interlayer material for the purposes of the present invention can be any conventionally known or commercially available thermoplastic material which is flexible enough yet rigid enough to be passed through an ink jet printer. An interlayer of the present invention can have any thickness which can be accommodated on an ink jet printer, but typical interlayers thickenesses are in a range of from about 30 mils to about 60 mils. Suitable thermoplastic materials include polyurethane (PUR), polyesters such as polyethylene terephthalate (PET), ethylene/vinyl acetate copolymers (EVA), polyvinyl chloride (PVC), and polyvinyl butyral (PVB), polyolefins such as polyethylene and/or polypropylene, for example. Preferred for the purposes of the present invention is PVB. PVB is available commercially from E.I. DuPont de Nemours & Co., under the tradename of Butacite®, for example.

Ink jet printing onto an interlayer material of the present invention is preferably conducted using pigmented ink. Pigmented inks are preferred because of their color-fastness, thermal stability, edge definition, and low diffusivity on the printed substrate. In conventional practice, the pigment is suspended in a liquid medium that is conventionally referred to as the "vehicle". Suitable pigments for use in the practice of the present invention are generally well known pigments, and are commercially available. For example, suitable pigments for use herein can include: Metallized Azo Reds such as Red 49:1 (Barium salt), Red 49:2 (Calcium salt), Red 63:1 (Calcium salt); Toluidine Reds; Naphthol Reds; Lithol Red (Barium); Lithol Red (calcium); Lithol Rubine; Bon red; Pyrazolones; Rhodamine B; Rhodamine Y; Quiacridones such as Red B, Red Y, Magenta B, Magenta and violet; Perylene Maroon; Perylene Violet; Phthalocyanine blues; Phthalocyanine greens; Carbazole violets; Methyl Violet; Monoarylide Yellow; Arylide Yellow; Diarylide Yellow; Monoazo Yellow; Diazo Yellow; Isoindoline Yellow; Chrome yellow; Quinophthalone Yellow; Diarylide Orange; Benzimidazolone Orange; Red Lack C; Lithol reds (calcium and barium salts); Lithol Rubine; Bon Maroon; Perylene pigments; Red 2B: Calcium, Strontium, Barium and Manganese salts; Chrome Yellow; Chrome Orange; Molybdate orange; Orange 36; Diarylide orange; Dianisidine orange; tolyl orange; and Dinitraniline orange; Carbon black; Zinc oxide; Cadmium sulfide; Iron oxide; Chromates of lead, zinc, barium, and calcium; Azo; Thioindigo; Anthraquinone; Anthoanthrone; Triphenonedioxazine; and Fat dye pigments. Other pigments may be suitable for use herein. One of ordinary skill in the art would be able to ascertain suitable pigments for use herein once grounded in the art described in this invention.

Pigments suitable for use in the practice of the present invention can be dispersed in either an aqueous or a non-aqueous vehicle. A "non-aqueous" vehicle suitable for use herein can include water in some minor proportion (no greater than 16 wt %, preferably no greater than 10 wt %) when particular organic solvents are used. It can be preferable in some cases to include an organic solvent or solvents in an aqueous-based vehicle to improve jettability of ink. Various conventional solvents are known and can be used. For example alkylene glycol ethers, alkylene glycol esters, and mixtures or combinations of solvents may be useful herein. Useful, but less preferred, solvents include, for example, methyl isobutyl ketone (MIBK), methyl ethyl ketone (MEK), butyrolactone, and cyclohexanone. Suitable and preferred solvents include dipropylene glycol ethers and esters, such as for example dipropylene glycol ether acetates, and ethylene glycol butyl ethers. Various solvents suitable for use in the practice of the present invention are available commercially. For example, a list of solvents that can be suitable for use in the practice of the present invention is provided as Table 1 herein. In selecting a suitable solvent for use in the practice of the present invention, one of ordinary skill in the art can be guided in the selection by the following criteria. Preferred solvents have a flash point of greater than 100° C., more preferably greater than about 150° F., and an evaporation rate relative to butyl acetate (BuAc) of less than 0.03, more preferably less than about 0.01. Preferably a solvent used in the practice of the present invention has a viscosity of less than about 20 cp at 25° C., and more preferably less than about 5 cp. A suitable solvent has a surface tension of less than about 40 dynes/cm and more preferably less than about 30 dynes/cm. Dipropylene glycol methyl ether (DPM) and dipropylene glycol n-propyl ether (DPnP), for example, can be preferred.

TABLE 1

| Solvent | Flash Point (° F.) | Evap Rate (BuAc = 1) | Viscosity (cP) @ 25° C. | Surface tension |
|---|---|---|---|---|
| Propylene Glycol Methyl Ether | 88 | 0.62 | 1.7 | 27.7 |
| Dipropylene Glycol Methyl Ether | 167 | 0.035 | 3.7 | 28.8 |
| Tripropylene Glycol Methyl Ether | 250 | 0.0026 | 5.5 | 30 |
| Propylene Glycol Methyl Ether Acetate | 108 | 0.33 | 1.1 | 28.9 |
| Dipropylene Glycol Methyl Ether Acetate | 187 | 0.015 | 1.7 | 27.3 |
| Propylene Glycol n-Propyl Ether | 118 | 0.21 | 2.4 | 25.4 |
| Dipropylene Glycol n-Propyl Ether | 190 | 0.014 | 3.9 | 27.8 |
| Tripropylene Glycol n-Propyl Ether | 266 | 0.0009 | 6.3 | 29.3 |
| Propylene Glycol n-Butyl Ether | 145 | 0.093 | 2.8 | 27.5 |
| Dipropylene Glycol n-Butyl Ether | 212 | 0.006 | 4.9 | 28.4 |
| Tripropylene Glycol n-Butyl Ether | 259 | 0.0004 | 7 | 29.7 |
| Propylene Glycol Phenyl Ether | 247 | 0.002 | 25.2 | 38.1 |
| Propylene Glycol Diacetate | 187 | 0.036 | 2.6 | 32.5 |
| Dipropylene Glycol Dimethyl Ether | 149 | 0.13 | 1 | 26.3 |
| Diethylene Glycol Ethyl Ether | 215 | 0.01 | 3.6 | 31.8 |
| Diethylene Glycol Methyl Ether | 197 | 0.019 | 3.5 | 34.6 |
| Diethylene Glycol n-Butyl Ether | 210 | 0.004 | 4.9 | 30 |
| Diethylene Glycol Hexyl Ether | 260 | <0.01 | 6.2 | 29.2 |
| Diethylene Glycol n-Butyl Ether Acetate | 221 | <0.01 | 4.5 | 30 |
| Ethylene Glycol Propyl Ether | 135 | 0.2 | 2.7 | 26.3 |
| Ethylene Glycol n-Butyl Ether | 149 | 0.079 | 2.9 | 27.4 |
| Ethylene Glycol Hexyl Ether | 210 | <0.01 | 4.5 | 27.7 |
| Ethylene Glycol n-Butyl Ether Acetate | 165 | 0.04 | 1.6 | 27.4 |
| Triethylene Glycol Methyl Ether | 275 | <0.01 | 6.2 | 36.4 |
| Triethylene | 265 | <0.01 | 6.8 | 33.7 |

TABLE 1-continued

| Solvent | Flash Point (° F.) | Evap Rate (BuAc = 1) | Viscosity (cP) @ 25° C. | Surface tension |
|---|---|---|---|---|
| Glycol Ethyl Ether | | | | |
| Triethylene Glycol n-Butyl Ether | 280 | <0.01 | 7.9 | 29.8 |
| Ethylene Glycol Phenyl Ether | 250 | 0.001 | 21.5 | 42 |
| Ethylene Glycol Phenyl Ether | 250 | 0.001 | 21.5 | 42 |
| Ethylene Glycol Ethyl Ether Mixture | 290 | <0.01 | 13.2 | 43 |
| Ethylene Glycol n-Butyl Ether Mixture | 300 | <0.01 | 10.4 | 39.9 |
| Ethylene Glycol n-Hexyl Ether Mixture | 315 | <0.01 | 15.3 | 39.8 |

Whether non-aqueous based, aqueous based, or a mixture of aqueous and non-aqueous based vehicles, inks of the present invention have a viscosity that is sufficiently low that they can be jetted though a printing head of an ink jet printer without the necessity of heating the print head in order to lower the viscosity of the ink. In the practice of the present invention, the ink viscosity is below about 30 centipoise (cps), as measured at 25° C. Preferably the ink viscosity is below about 20 cps at 25° C. More preferably the ink viscosity is below about 15 cps, and most preferably below about 12 cps at 25° C.

Without being held to theory, the Applicants believe that problems with image quality using ink jet printing systems can result because ink systems used for jet printing have a much lower viscosity than, for example, inks used in a silk screen printing process. The low viscosity ink can "run" by gravity into the valleys of a roughened PVB surface. The inks, therefore, can form puddles in the low areas on the surface of the PVB, and will not adhere uniformly to the high spots. Therefore, while a low viscosity ink is preferred, the viscosity should not be so low that the image quality is poor in the laminate, or that misting occurs during the printing process. Preferably the ink has a viscosity above about 1 cps. For DOD printing processes, the ink preferably has a viscosity above about 1.5 cps, more preferably above about 1.7, and most preferably above about 1.8 cps measured at 25° C. Viscosity of the inks are determined according to DuPont Standard Test Methods.

Preferable inks for use in the practice of the present invention are those that provide printed images having a satisfactory combination of image quality, and light fastness. Further, laminates that incorporate image-bearing interlayers of the present invention should have the adhesion properties described herein. Due to the nature of the polymeric interlayer substrates used herein for printing, and the requirements for adhesion in a safety glass, choice of a suitable ink is not problem free. An ink suitable for use in the practice of the present invention must also be compatible with the substrate to give satisfactory results. It has been discovered that suitable inks for use in the practice of the present invention can be obtained using the pigments selected from the group consisting of: PY 120; PY 155; PY 128; PY 180; PY 95; PY 93; PV19/PR 202; PR 122; PB 15:4; PB 15:3; and PBI 7. One skilled in the art would know that the designations above are color index numbers for the various pigments. Suitable pigments and ink sets for use in the practice of the present invention are also described in U.S. Provisional Patent Application Ser. No. 60/483516, filed Jun. 26, 2003, entitled "Non-Aqueous Inkjet Ink Set", incorporated by reference herein as if fully set forth.

Weatherability, that is the ability of a pigment or dye to hold its original color after prolonged exposure to the environment, is a key concern for an ink set useful in the practice of the present invention. Weatherability can be assessed by accelerated weathering of color blocks, according to ASTM G90 cycle 2. Weathered samples can be weathered in a range of from 120 KLangley (approximately 1 year of natural exposure) to 1,200 KLangley (approximately 10 years of natural exposure). Suitable pigments for use herein typically have a Delta E (that is, the magnitude of change in the E value) after accelerated weathering of less than or equal to about 8, preferably the Delta E is less than about 3.5, more preferably less than about 2.5, and most preferably less than about 2.0 on samples that have 480 KLangley exposure times. Delta E is determined from L, a*, and b* color measurements according to the following equation:

Delta $E = [(L_i - L_w)^2 + (a^*_i - a^*_w)^2 + (b^*_i - b^*_w)^2]^{1/2}$, where $L_i$, $a^*_i$, and $b^*_i$ are initial color measurements and $L_w$, $a^*_w$, and $b^*_w$ are color measurements after weathering. L, a*, and b* are color scale axes that are conventionally used to describe the degree of lightness, i.e. black/white (L), red/green (a*), and blue/yellow (b*) in an image. A Delta E of less than about 10 is suitable in the practice of the present invention. One of ordinary skill in the printing art would know how to interpret the Delta E values presented herein, but for sake of comparison, a Delta E of from about 2 to 5 would be acceptable to an untrained eye without a control for comparison, and a Delta E of less than about 1.5 would not be detectable to the human eye. It has been found in particular that yellow pigments conventionally known for light-fastness and weatherability did not perform as expected in the practice of the present invention, while other pigments gave surprisingly good performance in the practice of the present invention. These unexpected results can, without being held to theory, be ascribed to a synergistic relationship between these unexpectedly superior pigments and the polymeric substrate.

Printing heads useful for piezo electric processes are available from, for example, Epson, Seiko-Epson, Spectra, XAAR and XAAR-Hitachi. Printing heads useful for thermal ink jet printing are available from, for example, Hewlett-Packard and Canon. Printing heads suitable for continuous drop printing are available from Iris and Video Jet, for example.

Optionally included in an ink system of the present invention is a binder resin. A binder resin can be preferable to improve adhesion between the ink and the laminate substrate. Suitable binders for use in the practice of the present invention include polyvinyl pyrilidone/vinyl acetate (PVP/VA), polyvinyl pyrilidone (PVP), and PUR, for example. Mixtures of binder resins can also be useful in the practice of the present invention. Other binders are conventionally known and can be useful herein.

In one embodiment, the inks of the present invention do not include a binder. Typically binders are desirable in order to increase the affinity of ink to the substrate. However, added binder can increase the viscosity of ink such that the viscosity is too high for printing according to the process of the present invention. The Applicants have surprisingly discovered that a desirable level of adhesion in a laminate of the present invention can be obtained by use of a preferred solvent together with a pigment, allowing the Applicants to reduce or eliminate the binder in the ink. Alternatively, a suitable binder such as PVP/VA, PVP, or PUR for example can be used as a coating on the printing substrate prior to printing to improve the adhesion of the ink to the substrate rather than adding binder to the ink.

Traditionally, pigments are stabilized to dispersion in a vehicle by dispersing agents, such as polymeric dispersants or surfactants. More recently, so-called "self-dispersible" or "self-dispersing" pigments (hereafter "SDPs") have been developed that are suitable for use in the practice of the present invention. SDPs are dispersible in an aqueous vehicle without the use of traditional dispersants. The pigment particles of this invention can be stabilized according to several methods. The pigment particles can be made self-dispersing by a surface treatment as described in, for example, WO01/94476, herein incorporated by reference for all purposes as if fully set forth, or the pigment particles can be stabilized by treatment with dispersant in the traditional way as would be conventional and known to one of ordinary skill in the printing art, or the pigments can be dispersed by some combination of surface treatment and traditional treatment.

Preferably, if or when a traditional dispersant is employed, the dispersant can be a random or structured polymeric dispersant. Preferred random polymers include acrylic polymer and styrene-acrylic polymers. Most preferred, however, are structured dispersants, which include AB, BAB and ABC block copolymers, branched polymers and graft polymers. Some useful structured polymers are disclosed in U.S. Pat. No. 5,085,698, EP-A-0556649 and U.S. Pat. No. 5,231,131, which are incorporated herein by reference for all purposes as if fully set forth.

The Frequency of the roughened interlayer surface can be an important factor in the practice of the present invention. In some embodiments of the present invention, the Frequency can determine the image quality, and can make a printed image unsuitable in many applications. The Frequency of the roughened surface can be calculated using data obtained from profilometer data. In the practice of the present invention, a suitable Frequency is above about 0.90 cycles/mm. It is preferable that the Frequency be in the range of from about 0.90 cycles/mm to about 3 cycles/mm. More preferably, the Frequency is in the range of from about 1.0 to about 2.9, and most preferably the Frequency is in the range of from about 1.1 to about 2.5 cycles/mm. Above the upper limit significant improvement in the image quality may not be observed. Below the lower limit, the image quality may be poor. However, it should be noted that in some applications in the practice of the present invention the quality of the printed image may not be as important as other factors such as adhesion, weatherability, and/or cost, for example. Therefore, while the Frequency of an interlayer can be an important factor in the practice of the present invention, it may not be a determining factor as relating to the invention practiced herein.

In another embodiment of the present invention, an image can be printed on a smooth interlayer surface, which can then be laminated to a roughened interlayer surface. In this manner the image quality can be improved without losing the necessary ability to remove air from between the interlayer sheets during the process of lamination.

In another embodiment, the invention is a laminate comprising an image-bearing thermoplastic interlayer of the present invention. The interlayer can be laminated together with various transparent substrates such as, for example, glass or polycarbonate. Preferably, the image-bearing interlayer sheet is laminated between at least two sheets of glass. Other layers of interlayer can be positioned between the image-bearing interlayer and the glass, for example as in a glass/"conventional PVB"/"printed PVB"/glass laminate, wherein the printed PVB surface is in contact with the conventional PVB interlayer surface. Conventional laminating techniques are useful and effective in obtaining laminates of the present invention.

As a rule of thumb, the Applicants have found that the adhesion of an image-bearing laminate of the present invention can depend on the level of adhesion of the individual inks used to form the image, as well as the relative amount of each ink used in forming the image. For example, it can be expected that the adhesion of an image-bearing laminate of the present invention will be no lower than the lowest adhesion demonstrated by an individual ink in a given color set, and no higher than the highest adhesion demonstrated by an individual ink in that same ink set. Thus, a laminate of the present invention has adhesion which is a composite of the adhesion of the various inks used in the color set, and likely to be intermediate between the lowest and highest adhesion levels of the individual inks, depending on formulation.

The composite adhesion of a particular ink formulation suitable for use herein should be at least about 1000 psi, as measured by a compressive shear test. If individual inks of a formulation do not exhibit adhesion of at least 1000 psi, a suitable laminate can still be obtained if they are not included in the formulation in an amount substantial enough to lower the composite adhesion to less than about 1000 psi. By way of illustration, consider an ink formulation "K" which includes individual inks A, B, C, and D—each having adhesion of 1500 psi, 1300 psi, 1200 psi, and 850 psi, respectively. An image-bearing laminate suitable for the practice of the present invention could still be obtained from K by preparing the formulation such that D is not included in an amount significant enough to lower the adhesion of the laminate. However, it is preferred that each ink in the ink formulation exhibit adhesion of at least about 1000 psi.

In any event, a laminate of the present invention has overall adhesive strength of at least about 1000 psi, which is a level of adhesion suitable for safety glass applications. Preferably the adhesion is at least about 1400 psi. More preferably, the adhesion of a laminate of the present invention is greater than or equal to about 1500 psi, and even more preferably greater than or equal to about 1700 psi. Most preferably the laminate has an adhesive strength of greater than or equal to about 1800 psi.

Laminates of the present invention can be used in any application wherein conventional (that is, non-decorative) laminated glass is used. In addition to the conventional uses as safety glass, however, the laminates of the present invention can be used as decorative articles such as picture windows, decorative countertops, graphic art, image-bearing storefront windows, displays bearing company logos, advertising media, and/or any other use wherein a transparent laminate bearing an image can be desirable.

Laminates of the present invention can be obtained from the image-bearing interlayer and known materials useful for producing safety glass or windows, such as glass or polycarbonate, for example. Lamination of the interlayer to the other components can be accomplished using conventional lamination techniques. For example, an image-bearing interlayer can be laminated to glass by pressing the interlayer between two sheets of glass at an elevated temperature and pressure, under conditions by which air bubbles can be removed or prevented from being trapped in the laminate article.

In another embodiment, the present invention is an image-bearing interlayer sheet that has been printed on according to the process described herein. A printed interlayer sheet of the present invention can be laminated with other suitable interlayer materials, such as PET, PUR and/or PVB, to obtain a stacked interlayer that can in turn be laminated with a suitable substrate of the present invention, such as glass or polycarbonate for example.

An image-bearing interlayer which can be obtained by a process comprising the step of feeding a substrate thermoplastic film through a conventional ink jet printer and ink-jet printing an image onto the surface of the film, and then laminating the image-bearing film with at least a second sheet of a thermoplastic interlayer material. The composite printed interlayer preferably has a thickness of from about 30 to about 60 mils. The other thermoplastic sheets can be: blank; bear printed images or solid colors; transparent, semi-transparent, opaque or any solid, translucent color such as red, green, blue, or white; otherwise visually distinct from the printing substrate.

EXAMPLES

The following examples are presented to illustrate the invention. The examples are not intended to limit the scope of the invention in any manner. Together with the description of the invention and the teachings included herein, the Examples set forth the invention in such a manner that one of ordinary skill in the art would have a clear concept of the invention claimed herein.

Test Methods

Surface Roughness, Rz, is determined from the 10-point average roughness as described in ISO-R468 and is expressed in microns. Surface roughness is measured using a Mahr Federal (Providence, R.I.) surfanalyzer. Surface Pattern Frequency is calculated from the surfanalyzer data by making a graph of the autocorrelation function vs. distance of the profilometer data. The autocorrelation data is analyzed by fast Fourier transform. The reported frequency of the surface pattern is the median frequency.

Compressive Shear Adhesion Test: Laminate adhesion (given in terms of compressive shear strength) is determined by the compressive shear test. The compressive shear strength is determined by sawing a laminate into six 2.54 cm×2.54 cm chips. The chips are held in a jig at 45° and a compression testing instrument is used to place force on the chip at the rate of 0.25 cm/min. The amount of force to cause cohesive failure of the glass-PVB bond is the compressive shear strength of the laminate.

Image Quality Test Image quality was determined for each laminate by visually ranking the samples with respect to resolution and mottle.

Accelerated Weathering Test Laminates were prepared and the CIE L*, a*, b* color of the laminates was measured. The laminates were submitted for accelerated weathering according to the ASTM G90 cycle 2 protocol. The change in CIE L*, a*, b* color was measured as the samples returned from exposure. On average exposure to 480,000 langley corresponds to approximately 4 years of natural weathering.

Printing/Lamination Process

The image of interest was ink jet printed onto the 30 mil thick interlayer using either commercially available or experimental inks. Prior to lamination the sheeting layers are conditioned to 27% RH for a minimum of 16 hours. For lamination, a layer of 15 mil clear interlayer is placed on the image bearing surface. A second 15 mil thick layer of interlayer was placed behind the image. The multi-layered structure is deaired either using a vacuum bag or nip roll process and autoclaved using standard lamination conditions. Once the laminate is autoclaved, the laminate is tested for adhesion using the compressive shear adhesion test. The results are given in Table 2 below. The laminate was also visually graded for image quality with respect to mottle and resolution. The results are given in Table 3 below.

Examples 1-4

The ink was ink jet printed onto PVB using an Epson 3000 printer. The samples were air dried and laminated as described above. Example 1. The ink formulations are given below:

| | Ink Formulations (weight percent) | | | |
|---|---|---|---|---|
| Color | Magenta | Yellow | Cyan | Black |
| Magenta Dispersion (7% pigment) | 36.08 | | | |
| Yellow Dispersion (7% pigment) | | 35.23 | | |
| Cyan Dispersion (5.5% pigment) | | | 28.35 | |
| Black Dispersion (7% pigment) | | | | 27.43 |
| Dowanol ® DPM | 0.00 | 0.00 | 28.66 | 29.03 |
| Dowanol ® DPMA (dipropylene glycol methyl ether acetate) | 38.35 | 38.86 | 42.99 | 43.54 |
| Dowanol ® DPnP (dipropylene glycol mono-n-propyl ether) | 25.57 | 25.91 | 0.00 | 0.00 |
| Total | 100.00 | 100.00 | 100.00 | 100.00 |

Example 2

The ink formulations are given below:

| | Ink Formulations (weight percent) | |
|---|---|---|
| Color | Magenta | Black |
| Magenta Dispersion (20% pigment) | 22.50 | |
| Black Dispersion (15% pigment) | | 18.10 |
| PUR 425/DPM | 22.50 | 22.50 |
| 2-PyrroIodione | 15.00 | 17.00 |
| Isopropanol | 15.00 | 17.40 |
| Dowanol ® DPM | 25.00 | 25.00 |
| Total | 100.00 | 100.00 |

Example 3

The ink formulation given below:

| Color | Ink Formulations (weight percent) Yellow |
|---|---|
| Yellow Dispersion (20% pigment) | 34.40 |
| Dowanol ® DPMA (dipropylene glycol methyl ether acetate) | 37.00 |
| Dowanol ® DPnP (dipropylene glycol mono-n-propyl ether) | 24.60 |
| PVP/DPM | 4.00 |
| Total | 100.00 |

Example 4

The ink formulation is given below:

| Color | Ink Formulations (weight percent) Magenta |
|---|---|
| Magenta Dispersion (20% pigment) | 18.50 |
| PVP/VA 635 | 1.50 |
| Dowanol ® DPM | 80.00 |
| Total | 100.00 |

Comparative Example 1

The ink was obtained commercially from Mimaki and the samples were printed on a JV3 ink jet printer.

Comparative Example 2

The ink formulations are given below:

| Color | Ink Formulations (weight percent) | | |
|---|---|---|---|
| | Magenta | Yellow | Cyan |
| Magenta Dispersion (15% pigment) | 28.5 | | |
| Yellow Dispersion (15% pigment) | | 28.5 | |
| Cyan Dispersion (15% pigment) | | | 22.5 |
| DI Water | 40.00 | 40.00 | 40.00 |
| Dowanol ® DPM | 31.00 | 31.00 | 37.00 |
| PYK 348 | 0.50 | 0.50 | 0.50 |
| Total | 100.00 | 100.00 | 100.00 |

Comparative Example 3

The ink formulation is given below.

| Color | Ink Formulations (weight percent) Cyan |
|---|---|
| Cyan Dispersion (20% pigment) | 27.25 |
| Dowanol ® DPM | 72.75 |
| Total | 100.00 |

TABLE 2

Adhesion Results

| Example | Color | % T | Adhesion, N/cm² | Adhesion, psi |
|---|---|---|---|---|
| 1 | Cyan | 82 | 1445 | 2096 |
| | Magenta | 84 | 1501 | 2178 |
| | Yellow | 94 | 1221 | 1772 |
| | Black | 72 | 1538 | 2232 |
| 2 | Magenta | 49 | 1473 | 2137 |
| | Black | 21 | 1288 | 1869 |
| 3 | Yellow | 91 | 1449 | 2102 |
| 4 | Magenta | 74 | 2026 | 2939 |

TABLE 2-continued

Adhesion Results

| Example | Color | % T | Adhesion, N/cm² | Adhesion, psi |
|---|---|---|---|---|
| C1 | Purple | 52 | 592 | 859 |
| | Green | 78 | 618 | 896 |
| | Black | 47 | 846 | 1228 |
| | Brown | 49 | 600 | 871 |
| C2 | Cyan | 72 | 570 | 827 |
| | Magenta | 71 | 875 | 1270 |
| | Yellow | 91 | 835 | 1211 |
| C3 | Cyan | 63 | 970 | 1408 |

Examples 5-7

The surface pattern on the sheeting used in Examples 5-7 and Comparative Examples 4 and 5 was generated by melt fracture. The surface pattern on the sheeting used in Comparative Example 7 was generated by embossing where the deairing channels are aligned in parallel rows as opposed to the more random deairing channels found on sheeting where the pattern was generated by melt fracture.

TABLE 3

Image Quality Results

| Example | Pattern Generation | Roughness | Frequency | Acceptability |
|---|---|---|---|---|
| 5 | Melt Fracture | 45 | 2.0 | Yes |
| 6 | Melt Fracture | 25 | 1.4 | Yes |
| 7 | Melt Fracture | 21 | 2.0 | Yes |
| C4 | Melt Fracture | 31 | 0.70 | No |
| C5 | Melt Fracture | 48 | 0.90 | No |
| C6 | Embossed | 50 | 3.5 | No |

The lightfastness testing was performed as described above and reported in Table 4. The delta E values for examples 8-18 are less than or equal to 8 after 480,000 langley of exposure. The pigments given in Comparative Examples 7-9 were unexpectedly found to have poor lightfastness.

TABLE 4

Light-fastness Results

| Example | Pigment | Delta E 480 KLangley |
|---|---|---|
| 8 | PY 120 | 2 |
| 9 | PY 155 | 3 |
| 10 | PY 128 | 3 |
| 11 | PY 180 | 8 |
| 12 | PY 95 | 6 |
| 13 | PY 93 | 4 |
| 14 | PV 19/PR 202 | 4 |
| 15 | PR 122 | 2 |
| 16 | PB 15:4 | 3 |
| 17 | PB 15:3 | 2 |
| 18 | PBl 7 | 0.7 |
| C7 | PY 14 | 67 |
| C8 | PY 110 | 19 |
| C9 | PY 139 | >70 |

Example 19

Using an Epson 3000 printer set to print a full color image at 1440 dpi, images were printed on annealed 30-mil thick PVB; as described above, except that the PVB had a smooth surface. No mottling-or other visual defects were observed on the image-bearing substrate. The resolution was excellent.

Example 20

The procedure of Example 19 was repeated, except that polyurethane was used as the printing substrate. There were no mottling or other visual defects observed on the image-bearing substrate. The resolution was excellent.

Example 21

The procedure of Example 19 was repeated, except that PET was used as the printing substrate. There were no mottling or other visual defects observed on the image-bearing substrate. The resolution was excellent.

Example 22

The procedure of Example 19 was repeated, except that DuPont Tedlar® was used as the printing substrate. There were no mottling or other visual defects observed on the image-bearing substrate. The resolution was excellent.

Examples 23-26

Any of the smooth image-bearing substrates of Examples 19 through 22 can be laminated according to the laminating process described hereinabove, to provide image-bearing laminates with excellent photo-quality images, except that problems with de-airing can occur in laminates of size greater than 18 inches by 18 inches.

What is claimed is:

1. A process for obtaining an image-bearing laminate, the process comprising the steps:
   (a) providing a first thermoplastic polyvinyl butyral interlayer sheet having a roughened polyvinyl butyral interlayer surface, the surface having a roughness ($R_z$) of from about 30 μm to about 60 μm and a Frequency of greater than 0.9 cycles/mm;
   (b) ink jet printing a digital image, using an organic solvent-based, pigmented ink, onto the roughened surface of the first thermoplastic polyvinyl butyral interlayer sheet to obtain an image-bearing thermoplastic polyvinyl butyral interlayer sheet;
   (c) providing a second thermoplastic polyvinyl butyral interlayer sheet;
   (d) placing the second thermoplastic polyvinyl butyral interlayer sheet over the image-bearing surface of the first thermoplastic polyvinyl butyral interlayer sheet;
   (e) providing a third thermoplastic polyvinyl butyral interlayer sheet;
   (f) placing the third thermoplastic polyvinyl butyral interlayer sheet on the side of first thermoplastic polyvinyl butyral interlayer sheet opposite the image-bearing surface; and
   (g) laminating the thermoplastic polyvinyl butyral interlayer sheets between two sheets of transparent materials selected from the group consisting of glass or polycarbonate to obtain an image-bearing laminate;
   wherein:
   (i) the pigmented ink (A) has a viscosity of in the range of from about 1 cps to about 30 cps measured at 25° C., (B) does not contain a binder, and (C) comprise at least one pigment selected from the group consisting of Pigment Yellow 120; Pigment Yellow 155; Pigment Yellow 128; Pigment Yellow 180; Pigment Yellow 95; Pigment Yellow 93; Pigment Violet 19/Pigment Red 202; Pigment Red 122; Pigment Blue 15:4; Pigment Blue 15:3; and Pigment Black 7;
   (ii) organic solvent is selected from the group consisting of alkylene glycol ether, alkylene glycol ester or mixtures thereof; and
   (iii) the resulting image-bearing laminate has a laminate adhesive strength of at least about 1500 psi.

2. The process of claim 1 wherein the viscosity of the ink is in the range of from about 1.5 cps to about 20 cps.

3. The process of claim 2 wherein the viscosity of the ink is in the range of from about 1.7 cps to about 15 cps.

4. The process of claim 3 wherein the viscosity of the ink is in the range of from about 1.8 cps to about 12 cps.

5. The process of claim 1 wherein the organic solvent is selected from the group consisting of: propylene glycol ethers; dipropylene glycol ethers; ethylene glycol butyl ethers; and dipropylene glycol monomethyl ether esters.

6. The process of claim 1 wherein the organic solvent consists essentially of dipropylene glycol monomethyl ether acetate.

7. The process of claim 1 wherein the pigmented ink comprises a dispersant.

8. The process of claim 7 wherein the dispersant comprises a structured polymer.

9. The process of claim 7 wherein the dispersant comprises: AB, BAB and ABC block copolymers, branched polymers and graft polymers.

10. The process of claim 9 wherein the image is printed using a drop on demand ink jet printing process.

11. The process of claim 10 wherein the drop on demand process is a piezo electric process.

12. The process of claim 10 wherein the drop on demand process is a thermal ink jet printing process.

13. The process of claim 9 wherein the image is printed using a continuous drop ink jet printing process.

14. The process of claim 1 wherein the solvent is selected from the group consisting of dipropylene glycol ethers and dipropylene glycol monomethyl ether esters.

15. The process of claim 1 wherein the ink jet printing is carried out without heating the printing head above ambient temperature.

16. The process of claim 1 wherein the sheets of transparent materials are sheets of glass.

17. The process of claim 5 wherein the sheets of transparent materials are sheets of glass.

18. The process of claim 10 wherein the sheets of transparent materials are sheets of glass.

19. The process of claim 1 wherein the second thermoplastic polyvinyl butyral interlayer sheet is clear.

20. A process for obtaining an image-bearing laminate the process comprising the steps:
   (a) providing a first thermoplastic polyvinyl butyral interlayer sheet having a roughened polyvinyl butyral interlayer surface, the surface having a roughness ($R_z$) of from about 30 μm to about 60 μm and a Frequency of greater than 0.9 cycles/mm;
   (b) ink jet printing a digital image, using an organic solvent-based, pigmented ink, onto the roughened surface of the first thermoplastic polyvinyl butyral interlayer sheet to obtain an image-bearing thermoplastic polyvinyl butyral interlayer sheet;
   (c) providing a second thermoplastic polyvinyl butyral interlayer sheet;

(d) placing the second thermoplastic polyvinyl butyral interlayer sheet over the image-bearing surface of the first thermoplastic polyvinyl butyral interlayer sheet;
(e) providing a third thermoplastic polyvinyl butyral interlayer sheet;
(f) placing the third thermoplastic polyvinyl butyral interlayer sheet on the side of first thermoplastic polyvinyl butyral interlayer sheet opposite the image-bearing surface; and
(g) laminating the thermoplastic polyvinyl butyral interlayer sheets between two sheets of transparent materials selected from the group consisting of glass or polycarbonate to obtain an image-bearing laminate;
wherein:
(i) the pigmented ink (A) has a solvent selected from the group consisting of an alkylene glycol ether, alkylene glycol ester or mixtures thereof, (B) has a viscosity of in the range of from about 1 cps to about 30 cps measured at 25° C., (C) contains a binder selected from the group consisting of: polyurethane, polyvinyl pyrrolidone/polyvinyl acetate, polyvinyl pyrrolidone, and mixtures thereof, (D) comprises a dispersant selected from AB, BAB and ABC block copolymers, branched polymers and graft polymers, and (E) comprise at least one pigment selected from the group consisting of Pigment Yellow 120; Pigment Yellow 155; Pigment Yellow 128; Pigment Yellow 180; Pigment Yellow 95; Pigment Yellow 93; Pigment Violet 19/Pigment Red 202; Pigment Red 122; Pigment Blue 15:4; Pigment Blue 15:3; and Pigment Black 7; and
(ii) the resulting image-bearing laminate has a laminate adhesive strength of at least about 1500 psi.

21. The process of claim 20 wherein the sheets of transparent materials are sheets of glass.

22. The process of claim 21 wherein the viscosity of the ink is in the range of from about 1.8 cps to about 12 cps.

23. The process of claim 20 wherein the image is printed using a drop on demand ink jet printing process.

24. The process of claim 23 wherein the drop on demand process is a piezo electric process.

25. The process of claim 24 wherein the solvent is selected from the group consisting of dipropylene glycol ethers and dipropylene glycol monomethyl ether esters.

26. The process of claim 25 wherein the sheets of transparent materials are sheets of glass.

27. The process of claim 26 wherein the second thermoplastic polyvinyl butyral interlayer sheet is clear.

28. The process of claim 27 wherein the ink jet printing is carried out without heating the printing head above ambient temperature.

29. The process of claim 1 wherein the interlayer has a surface roughness Frequency of from about 1.0 cycles/mm to about 2.9 cycles/mm.

30. The process of claim 29 wherein the interlayer has a surface roughness Frequency of from about 1.1 cycles/mm to about 2.5.

* * * * *